US011616694B2

(12) United States Patent
Corrales Lopez et al.

(10) Patent No.: US 11,616,694 B2
(45) Date of Patent: Mar. 28, 2023

(54) UNIDIRECTIONAL LINK DETECTION MISCONFIGURATION AUTO-DETECTION

(71) Applicant: HEWLETT PACKARD ENTERPRISE DEVELOPMENT LP, Houston, TX (US)

(72) Inventors: David Corrales Lopez, Heredia (CR); Daniel Canessa Valverde, Heredia (CR)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 16/856,628

(22) Filed: Apr. 23, 2020

(65) Prior Publication Data

US 2021/0336854 A1 Oct. 28, 2021

(51) Int. Cl.
| *H04L 41/0873* | (2022.01) |
| *H04L 41/12* | (2022.01) |
| *H04L 45/28* | (2022.01) |
| *H04L 45/12* | (2022.01) |
| *H04L 45/18* | (2022.01) |
| *H04L 101/622* | (2022.01) |

(52) U.S. Cl.
CPC .......... *H04L 41/0873* (2013.01); *H04L 41/12* (2013.01); *H04L 45/123* (2013.01); *H04L 45/18* (2013.01); *H04L 45/28* (2013.01); *H04L 2101/622* (2022.05)

(58) Field of Classification Search
CPC ... H04L 41/0873; H04L 45/18; H04L 45/123; H04L 45/28; H04L 29/12839; H04L 41/12; H04L 47/127; H04L 41/0869
See application file for complete search history.

(56) References Cited

U.S. PATENT DOCUMENTS

| 9,258,234 | B1* | 2/2016 | Addepalli | ............ H04L 43/0847 |
| 2008/0082142 | A1* | 4/2008 | Clark | ............ H04L 69/40 |
| | | | | 607/60 |
| 2014/0164640 | A1* | 6/2014 | Ye | ............ H04L 47/12 |
| | | | | 709/235 |

(Continued)

OTHER PUBLICATIONS

Foschiano, RFC: 5171, Cisco Systems Unidirectional Link Detection (UDLD) Protocol, Network Working Group, Apr. 2008), (Year: 2008).*

*Primary Examiner* — Jason E Mattis
*Assistant Examiner* — Robert Ma
(74) *Attorney, Agent, or Firm* — Park, Vaughan, Fleming & Dowler LLP (57) ABSTRACT

The disclosure provides a method for determining a configuration mismatch between a first device and a second device. During operation, a first device receives a plurality of Unidirectional Link Detection (UDLD) protocol messages from a second device. The first device is configured with a first interval configuration value corresponding to a frequency which the first device sends the UDLD protocol messages to the second device. The first device determines a second interval configuration value of the second device, which corresponds to a frequency which the second device sends the UDLD protocol messages to the first device. The first device determines that there is a configuration mismatch between the first device and the second device, and creates a log entry for the configuration mismatch, the log entry including the first and second interval configuration values.

17 Claims, 4 Drawing Sheets

(56) References Cited

U.S. PATENT DOCUMENTS

2014/0164641 A1* 6/2014 Ye .................. H04L 47/127
                                                  709/235
2018/0288167 A1* 10/2018 Dutta ................ H04L 43/103
2020/0389359 A1* 12/2020 Lopez ............... H04L 41/0869

* cited by examiner

UNIDIRECTIONAL LINK DETECTION MISCONFIGURATION AUTO-DETECTION

BACKGROUND

Entities that have installed large local area networks typically have a multitude of network infrastructure devices connected to the network. These infrastructure devices are typically connected to form the network using many different physical connection methods. The network infrastructure devices may be devices such as switches or routers that are used to facilitate the connection of multiple devices to the network and allow data to flow between each connected device. Connected devices, such as laptop computers, tablets, or other network enabled devices, may communicate with other devices in the network through data exchange paths facilitated by the network infrastructure devices.

Networks are ideally wired to form a "bus" type topology that may be configured in a "ring," "star," "spine and leaf," or another configuration. A bus topology, in this context, would be such that all devices on the network are wired in parallel to a single connection point that may allow a common interconnection among all devices. This "bus" topology, however, may not be feasible to implement in all cases and a network may be made up of several smaller segments that individually represent smaller bus segments joined together through interconnecting devices. One possible side effect of not being able to always implement a bus topology is that a network may form an unintended communication path where data may be unknowingly forwarded endlessly among several network infrastructure devices (e.g., undesirable loops may be formed). Some networks utilize a Spanning Tree Protocol (STP) to create logical networks inside the physical network to avoid such endless forwarding loops.

STP may rely on a bi-directional link between neighboring network infrastructure devices to be effective. A "neighboring network infrastructure device" in this context refers to network infrastructure devices adjacently connected together with a physical connection such as an Ethernet cable, a fiber optic cable, or any other connection mechanism available. That is, there are no intermediary devices between "neighboring" devices as they are directly connected to a common physical medium section. In some cases, a link between neighboring network infrastructure devices may become unidirectional (e.g. one side of the link may exclusively transmit or receive but not both), the forwarding loop may be inadvertently re-established. Unidirectional Link Detection (UDLD) protocol has several configurations that may be used in an attempt to avoid any forwarding loops caused by unidirectional links. To work properly, both ends of a unidirectional link should utilize the same configurations.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Today's networks may utilize a Spanning Tree Protocol (STP) to create logical networks inside the physical network to detect and avoid forwarding loops. A logical network, in this context, defines which physical interconnections to use when transmitting data between network infrastructure devices connected to the physical network (e.g., some physical ports on certain devices may be disabled). The logical network may optimize the use of physical network connections such that, for example, data transmitted between any network infrastructure devices traverses the shortest path. The logical network, in addition to utilizing the shortest path, may also avoid loops in a path. Loops are typically undesirable and affect network throughput, in part, because they may cause transmitted network data to be endlessly forwarded (e.g., traversing the loop) instead of being delivered to the intended destination device. In some cases, a network loop may cause failure of a network.

In general, STP utilizes a bi-directional link between neighboring network infrastructure devices to be effective. If the link between neighboring network infrastructure devices becomes unidirectional (e.g., one side of the link may exclusively transmit or receive but not both), a forwarding loop previously eliminated by STP may be inadvertently re-established. That is, as devices are added/removed from a network and components of a network experience failure, unintended loops may be created within a previously functioning network. The Unidirectional Link Detection (UDLD) protocol, used in conjunction with STP may avoid the forwarding loops from being re-established with unidirectional links. For example, the UDLD protocol may be used to detect unidirectional L2 links.

For the UDLD protocol to work effectively, network infrastructure devices should be configured to utilize the same or similar settings of UDLD protocol with all neighboring devices. Configurations may include an interval to send UDLD packets to a neighboring network infrastructure device and/or receive UDLD packets from neighboring network infrastructure device. Configurations may also include a number of times to retry sending a UDLD packet to a neighboring network infrastructure device when a response isn't received.

On correctly configured systems, each neighboring network infrastructure device has the same values for interval and retries for UDLD packets. This assures that both systems send and receive packets at appropriate times for them to check bidirectionality in a consistent fashion. When UDLD is misconfigured, one of the two peers may start sending packets faster than the other and possibly require less packet misses to determine that a link is unidirectional. This causes cyclic flaps on the interface (eventually triggering things such as LAG, OSPF, Multicast, etc. re-convergence). Accordingly, disclosed techniques represent an improvement for detecting and fixing misconfigurations.

The systems and methods described herein discuss a technique in which the UDLD daemon can deduce the remote configuration, compare it against the local one and generate an event to indicate that there's a misconfiguration. Optionally, the system can automatically adjust the UDLD configuration in response to the detection.

A method for UDLD misconfiguration auto-detection may include receiving, by a first device, a plurality of Unidirectional Link Detection (UDLD) protocol messages transmitted from a second device to a first device, wherein the plurality of ULDL messages are used to detect unidirectional L2 links and the first device is configured with a first interval configuration value corresponding to a frequency which the first device sends the UDLD protocol messages to the second device corresponding to a number of times that the first device will continue sending UDLD protocol messages to the second device at the first interval without receiving a response from the second device. The method may also include determining, by the first device, a second interval configuration value of the second device, the second interval configuration value corresponding to a frequency which the second device sends the UDLD protocol messages to the first device and determining, on the first device, that there is a configuration mismatch between the first device and the second device, wherein a correct configuration of the UDLD protocol requires the first device and the second device use a same number of intervals. The method may also include creating a log entry for the configuration mismatch, the log entry including the first and second interval configuration values.

Figure 1:
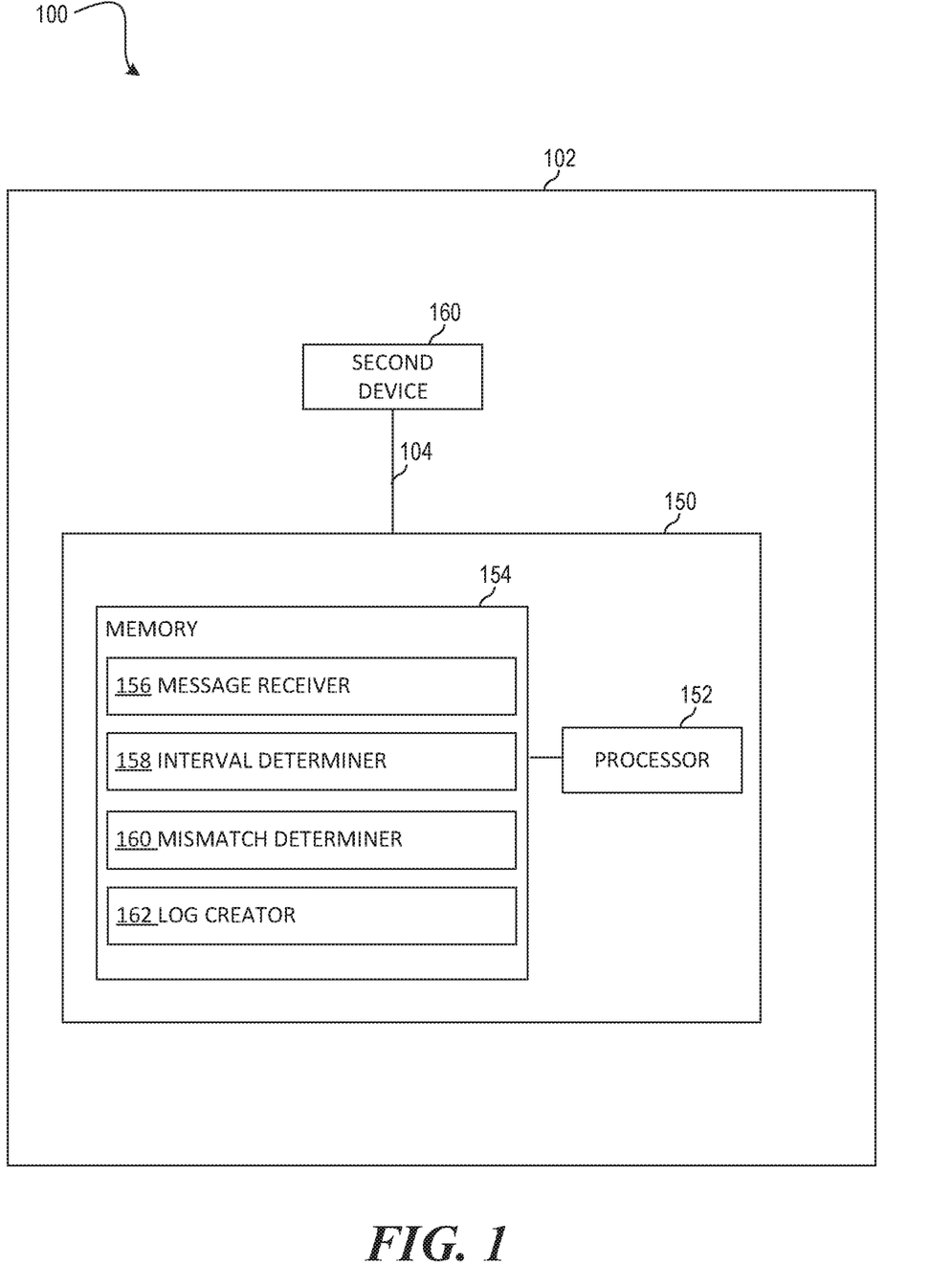
FIG. 1 is a block diagram of an example system for UDLD misconfiguration auto-detection.

FIG. 1 is a block diagram of an example system 100 for UDLD misconfiguration auto-detection. The system 100 may include a network 102 having a plurality of devices including first device 150 and a second device 160. Although only two devices are shown in system 100, this is for explanatory purposes only and any number of devices may be used in system 100.

Each of the devices 150 and 160 may be any number of network devices. For example, a network device may be a network switch. A switch may be a device within a network that forwards data sent by a sender device toward a recipient device (or multiple recipient devices). In some examples, a network device includes a layer 2 switch that forwards control packets (also referred to as data frames or data units) based on layer 2 addresses in the control packets. Examples of layer 2 addresses include Medium Access Control (MAC) addresses. In alternative examples, a switch includes a layer 3 router that forwards control packets based on layer 3 addresses, such as Internet Protocol (IP) addresses in the control packets.

A "packet" or "control packet" can refer to any unit of data that can be conveyed over a network. A packet or control packet may also refer to a frame or data frame, a data unit, a protocol data unit, Bridge Protocol Data Unit (BPDU) and so forth. A switch forwards data (in control packets) between a sender device and a recipient device (or multiple recipient devices) based on forwarding information (or equivalently, "routing information") accessible by the switch. The forwarding information can include entries that map network addresses (e.g., MAC addresses or IP addresses) and/or ports to respective network paths toward the recipient device(s). One type of control packet is a UDLD packet. The UDLD packet may be a control packet that includes information used by different elements of the system 100 to detect unidirectional L2 links.

The information included in the packet may include a MAC address of a device on the network where the packet originated. In some aspects, the system 100 may transmit special UDLD packets that are used for detecting unidirectional links, while in other aspects this information may be included in a normal control packet and/or in a control packet with additional types of information, included but not limited to payload data.

A switch forwards data (in control packets) between a sender device and a recipient device (or multiple recipient devices) based on forwarding information (or equivalently, "routing information") accessible by the switch. The forwarding information can include entries that map network addresses (e.g., MAC addresses or IP addresses) and/or ports to respective network paths toward the recipient device(s).

Each of the devices 150, 160 may be communicatively coupled to one or more of the other devices 150, 160 in system 100 via network link 104. Link 102 and the various connections between devices in the system may be a physical link, such as an Ethernet connection or other physical connection, a wireless connection, a virtual connection, etc.

Network device 150 may include a processor 152 and a memory 154 that may be coupled to each other through a communication link (e.g., a bus). Processor 152 may include a single or multiple Central Processing Units (CPU) or another suitable hardware processor(s), such as a network ASIC. Memory 154 may be a machine-readable storage medium that may store machine readable instructions executed by processor 152. Memory 154 may include any suitable combination of volatile and/or non-volatile memory, such as combinations of Random Access Memory (RAM), Read-Only Memory (ROM), flash memory, and/or other suitable memory.

Memory 154 stores instructions to be executed by processor 152 including instructions for message receiver 156, interval determiner 158, mismatch determiner 160 and log creator 162.

Processor 152 may execute packet receiver 160 to receive, by a first device, a plurality of Unidirectional Link Detection (UDLD) protocol messages transmitted from a second device to a first device. The plurality of ULDL messages may be used to detect unidirectional L2 links. The first device may be configured with a first interval configuration value corresponding to a frequency which the first device sends the UDLD protocol messages to the second device corresponding to a number of times that the first device will continue sending UDLD protocol messages to the second device at the first interval without receiving a response from the second device. The first device may be configured with a first retry configuration value corresponding to a number of times that the first device will continue sending UDLD protocol messages to the second device at the first interval without receiving a response from the second device. The plurality of UDLD messages sent from the second device to the first device may not include the second interval value.

In some aspects, memory 154 may also store instructions for a timestamp handler. Processor 152 may execute timestamp handler to timestamp handler to timestamp, by the first device, the plurality of UDLD protocol packets at the time the messages were received from the second device.

In some aspects, memory 154 may also store instructions for a threshold determiner. Processor 152 may execute threshold determiner to determine, by the first device, that a number of packets in the plurality of UDLD protocol packets meets a threshold value that is sufficient to determine the second interval and second configuration values while accounting for a cold boot scenario.

Processor 152 may execute interval determiner 158 to determine, by the first device, a second interval configuration value of the second device, the second interval configuration value corresponding to a frequency which the second device sends the UDLD protocol messages to the first device. The second device may also be configured with a second retry configuration value corresponding to a number of times that the second device will continue sending UDLD protocol messages to the first device at the second interval without receiving a response from the first device.

Processor 152 may execute mismatch determiner 160 to determine, on the first device, that there is a configuration mismatch between the first device and the second device. As discussed above, a correct configuration of the UDLD protocol may require the first device and the second device to use a same number of intervals in order to function properly. After a mismatch has been determined, the system may not attempt to determine another mismatch until a certain period of time has passed and/or until the UDLD configuration has changed is over.

However, when the UDLD configurations of the first and second device don't match (ie. the first interval configuration value does not match the second interval configuration value and/or the first retry configuration value does not match the second retry configuration value), one of the two peers may start sending packets faster than the other and possibly require less packet misses to determine that a link is unidirectional. This may cause cyclic flaps on the interface. For example, the first device may be configured to transmit packets to a second device at an interval of 2 seconds with 2 retries and the second device may be configured to transmit packets an interval of 7 seconds with 3 retries. Accordingly, the first device may continue to send packets but receive no response and stop resending the message after the second failed attempt, while the second device does not detect any errors because it is operating as configured and continue to send messages at the seven second interval.

In some aspects, memory 154 may also store instructions for an array handler. Processor 152 may execute array handler to store, by the first device, the plurality of UDLD protocol messages in a timestamp array after they have been received and clear the timestamp array after the configuration mismatch has been determined.

Processor 152 may execute log creator 162 to create a log entry for the configuration mismatch, the log entry including the first and second interval configuration values.

In some aspects, memory 154 may also store instructions for an interval changer. Processor 152 may execute interval changer to change, by the first device, the first interval configuration value of the first device to match the second interval configuration values of the second device.

In some aspects, memory 154 may also store instructions for a message transmitter. Processor 152 may execute message transmitter to transmit, by the first device, a configuration message to the second device, the configuration message indicating the configuration mismatch and including the first second interval configuration values.

In some aspects, memory 154 may also store instructions for a mode determiner. Processor 152 may execute mode determiner to determine, by the first device, a UDLD mode of the second device based on the plurality of UDLD protocol packets.

In some aspects, processor 152 may execute timestamp handler to reset the array after changing the first interval configuration value and/or transmitting the configuration message. Resetting the array may include removing a portion of or all of the data in the array.

Figure 2:
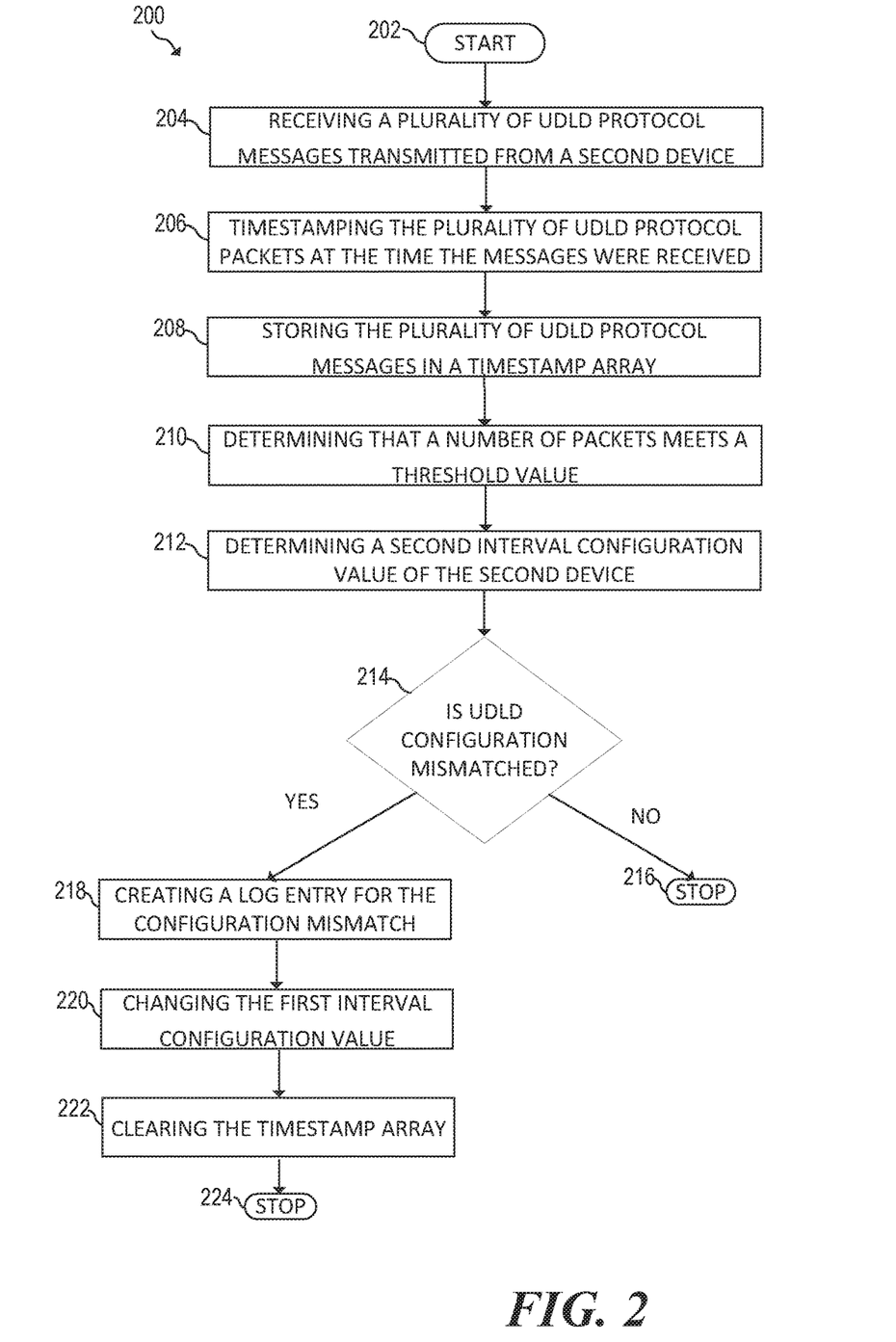
FIG. 2 is a flow diagram of an example method for UDLD misconfiguration auto-detection.

FIG. 2 is a flow diagram of a method 200 for UDLD misconfiguration auto-detection. The system where method 200 is performed may be similar to system 100 described above. Accordingly, parts of and/or the entire method may be performed by one or more of the devices belonging to system 100. The method 200 may begin at block 202 and proceed to block 204, where the method may include where the method may include receiving, by a first device, a plurality of Unidirectional Link Detection (UDLD) protocol messages transmitted from a second device to a first device. As described above, the plurality of ULDL messages may be used to detect unidirectional L2 links. Moreover, the first device may be configured with a first interval configuration value corresponding to a frequency which the first device sends the UDLD protocol messages to the second device. The first device may also be configured with a first retry configuration value corresponding to a number of times that the first device will continue sending UDLD protocol messages to the second device at the first interval without receiving a response from the second device. Similarly, the second device may be configured with a second interval configuration value corresponding to a frequency which the second device sends the UDLD protocol messages to the first device. The second device may also be configured with a second retry configuration value corresponding to a number of times that the second device will continue sending UDLD protocol messages to the first device at the second interval without receiving a response from the first device.

At block 206, the method may include timestamping, by the first device, the plurality of UDLD protocol packets at the time the messages were received from the second device; and at block 208, the method may include storing, by the first device, the plurality of UDLD protocol messages in a timestamp array.

In some aspects, a UDLD daemon of the first device may keep track whenever UDLD packets are received from the second device and use the timing that these packets are received to deduce a fairly accurate approximation of the second interval configuration value. The UDLD daemon the daemon may be run at the active management module (AMM) or standby management module (SMM) (on systems with redundant control planes).

The timestamp array may holds the last N received packet timestamps and is used to calculate the remote interval configuration. N may be any value but is typically equal to the threshold value (discussed below). Sometimes N may be larger than the threshold value for debugging or other purposes.

At block 210, the method may include determining that a number of packets meets a threshold value. There may be a variety of factors other than the first and second interval configuration values that affect the frequency at UDLD packets are sent from the first device to the second device and vice versa. For example, the threshold value may account for scenarios such as cold boot, where the system is more prone to jitter and delays in packet processing, which might lead to false positives if set too low. Accordingly, the method may collect a certain number of packets received from the second device before determining the second interval configuration value. An example threshold value may be 5-10 UDLD packets.

The method may proceed to block 212, where the method may include determining, by the first device, a second interval configuration value of the second device, the second interval configuration value corresponding to a frequency which the second device sends the UDLD protocol messages to the first device.

The method may proceed to block 214, where the method may include determining, on the first device, that there is a configuration mismatch between the first device and the second device, wherein a correct configuration of the UDLD protocol requires the first device and the second device use a same number of intervals. Put another way, the first device may try to determine the UDLD configuration settings of the second device.

It is important to note that the second interval configuration value determined by the first device is a deduced value and may not match the actual configuration of the second device. This deduced value is for the remote interval configuration and may be calculated off packet reception timestamps using a rolling average. Accordingly, this value should normally be treated with some leeway due to the network-induced jitter. For example, a misconfiguration decision may assume that this value has an error margin of 5%-10%.

However, some of the differences between the calculated and actual second interval configuration value may be caused by network buffering, jitter, and network stack latencies at the control plane, etc. The first device may account for these issues by applying a margin of error or other calculation adjustment to the calculate second interval configuration value.

For example, the determination of block 214 may include adjusting for variations in the packet receipt timings, such as when packets are sent more quickly than usual, during negotiation phases). The determination may also be adjusted with a jitter value to account for network/stack latencies.

If it is determined that the first and second configuration intervals match (NO Branch of block 214), then the method may proceed to block 216, where the method may end.

If it is determined that the first and second configuration intervals do not match (YES Branch of block 214), then the method may proceed to block 218, where the method may include creating a log entry for the configuration mismatch, the log entry may include the first and second interval configuration values. The log may be used to inform a system administrator of the configuration mismatch. In some aspects, the log may be sent to a user and/or administrator of the first device and/or the second device. This log may also include the first reset configuration value, so that second reset configuration value can be changed to match the first resent configuration value.

The method may proceed to block 220, where the method may include changing, by the first device, the first interval configuration value of the first device to match the second interval configuration values of the second device. In some aspects, a self-healing logic may be used to automatically change the first interval configuration value to match the peer's detected interval. In other aspects, the method may not automatically reconfigure the first interval value but instead require a user and/or administrator to modify the first interval configuration value. In some aspects, the first device may send a transmission to the second device instructing the second device to change the second interval configuration value to match the first interval configuration value. This message may also include the first reset configuration value, so that second reset configuration value can be changed to match the first reset configuration value.

The method may proceed to block 222, where the method may include clearing, by the first device, the timestamp array after the configuration mismatch has been determined. In some aspects, the timestamp array may be cleared at other times, such as periodically or some other time period. The method may proceed to block 224, where the method may end.

Different manufacturers (vendors) of network infrastructure devices may implement variations in their use of the UDLD protocol (as well as different configuration options). Thus, UDLD usage across different devices may not be compatible with network infrastructure devices produced by other manufacturers (or configured differently). These variations that may exist across differently configured devices are referred to herein as different "modes" of the UDLD protocol. Network infrastructure devices from the same manufacturer may also have the UDLD protocol options configured differently such that the UDLD protocol may not work effectively between neighboring network infrastructure devices. Further, network infrastructure devices (not having the benefit of disclosed techniques for auto-mode detection) may attempt to only communicate with neighboring devices with an expectation that all neighboring devices are configured for an identical UDLD mode. However, when neighboring network infrastructure devices are not configured with compatible UDLD protocol implementation and configuration options (not running in the same mode), the devices may not be able to effectively utilize the UDLD protocol and loop detection may be impacted (or nonexistent) for a network segment.

For example, a network administrator may further configure the multi-protocol network infrastructure device to control the method in which the UDLD mode is detected. One configuration option, for example, may allow the network administrator to indicate the preferred UDLD mode to use between neighboring network infrastructure devices. Another example configuration may allow the network administrator to decide if a detection of protocol difference will block a link to a neighboring network infrastructure device instead of attempting to detect the appropriate UDLD mode to be used. Still further, the multi-protocol infrastructure device may also override configuration options when the UDLD protocol specification dictates how situations such as a protocol mismatch should be handled. In some UDLD protocol specifications, for example, a mismatch in UDLD protocol, leading to the inability for the network infrastructure devices to communicate using any UDLD protocol, indicates a link between the neighboring network infrastructure devices should be shut down (e.g., port disabled) until a network administrator manually intervenes and configures both devices to use or detect a matching UDLD protocol mode. For example, if a network administrator configured a multi-protocol network infrastructure device to keep a link enabled when a mismatch in UDLD protocol was detected but the preferred UDLD protocol standard indicates a contradictory reaction, some disclosed implementations may allow the multi-protocol network infrastructure device to override the network administrator's configuration settings.

Accordingly, in some aspects, the method may include determining, by the first device, a UDLD mode of the second device and determining that the UDLD mode of the of the first device does not match the UDLD mode of the second device. In these aspects, the first device may include the UDLD mode of the first and second devices in the log entry and/or may take correction action concerning the UDLD mode, such as changing the UDLD of the first device to match the second device, transmit a message to the second device include the UDLD mode of the first and second device, etc.

Figure 3:
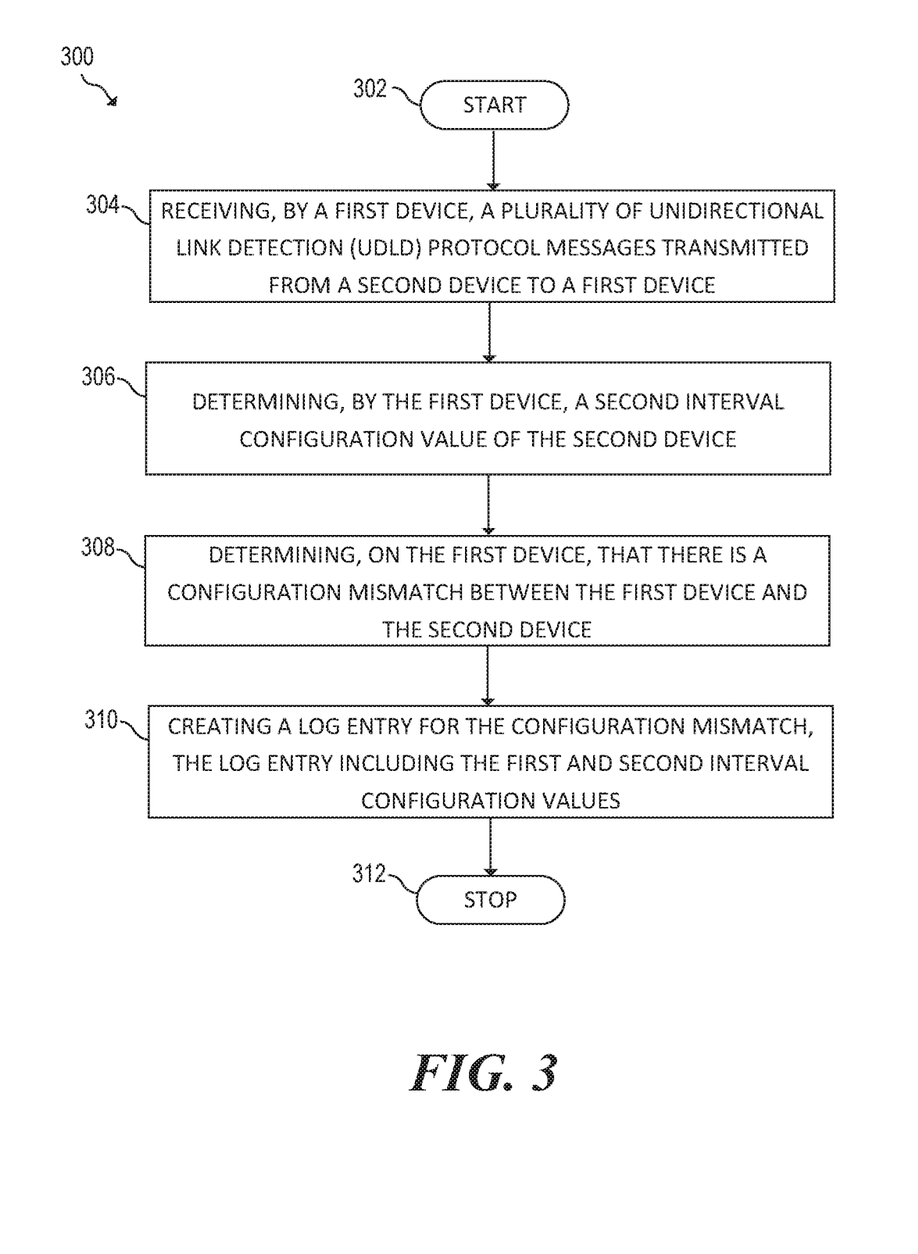
FIG. 3 is a flow diagram of another example method for UDLD misconfiguration auto-detection.

FIG. 3 is a flow diagram of another method 300 for UDLD misconfiguration auto-detection. The system where method 300 is performed may be similar to system 100 described above. Accordingly, parts of and/or the entire method may be performed by one or more of the devices belonging to system 100.

The method 300 may begin at block 302 and proceed to block 304, where the method may include receiving, by a first device, a plurality of Unidirectional Link Detection (UDLD) protocol messages transmitted from a second device to a first device. The plurality of ULDL messages may be used to detect unidirectional L2 links and the first device is configured with a first interval configuration value corresponding to a frequency which the first device sends the UDLD protocol messages to the second device corresponding to a number of times that the first device will continue sending UDLD protocol messages to the second device at the first interval without receiving a response from the second device. The plurality of UDLD messages sent from the second device to the first device may not include the second interval value. The method may proceed to block 306, where the method may include determining, by the first device, a second interval configuration value of the second device. The second interval configuration value may correspond to a frequency which the second device sends the UDLD protocol messages to the first device.

The method may proceed to block 308, where the method may include determining, on the first device, that there is a configuration mismatch between the first device and the second device. A correct configuration of the UDLD protocol may require the first device and the second device use a same number of intervals. The method may proceed to block 310, where the method may include creating a log entry for the configuration mismatch, the log entry including the first and second interval configuration values. The method may proceed to block 310, where the method may include creating a log entry for the configuration mismatch, the log entry including the first and second interval configuration values. The method may proceed to block 312, where the method may end.

Figure 4:
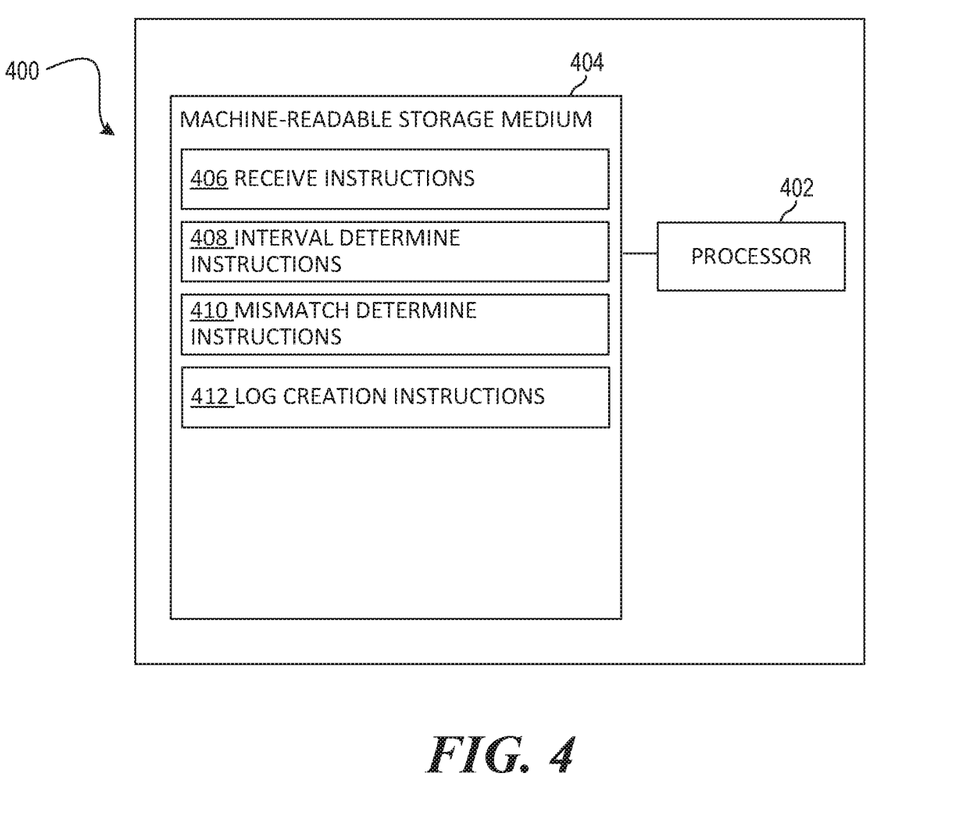
FIG. 4 is a flow diagram of another example system for UDLD misconfiguration auto-detection.

FIG. 4 is a block diagram of an example system 400 for UDLD misconfiguration auto-detection. In the example illustrated in FIG. 4, system 400 includes a processor 402 and a machine-readable storage medium 404. In some aspects, processor 402 and machine-readable storage medium 404 may be part of an Application-specific integrated circuit (ASIC). Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 may be at least one central processing unit (CPU), microprocessor, and/or other hardware devices suitable for retrieval and execution of instructions stored in machine-readable storage medium 404. In the example illustrated in FIG. 4, processor 402 may fetch, decode, and execute instructions 406, 408, 410 and 412. Processor 402 may include at least one electronic circuit comprising a number of electronic components for performing the functionality of at least one of the instructions in machine-readable storage medium 404. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 404 may be any electronic, magnetic, optical, or other physical storage device that stores executable instructions. Thus, machine-readable storage medium 404 may be, for example, Random Access Memory (RAM), an Electrically-Erasable Programmable Read-Only Memory (EEPROM), a storage drive, an optical disc, and the like. Machine-readable storage medium 404 may be disposed within system 400, as shown in FIG. 4. In this situation, the executable instructions may be "installed" on the system 400. Machine-readable storage medium 404 may be a portable, external or remote storage medium, for example, that allows system 400 to download the instructions from the portable/external/remote storage medium. In this situation, the executable instructions may be part of an "installation package". As described herein, machine-readable storage medium 404 may be encoded with executable instructions for context aware data backup. The machine-readable storage medium may be non-transitory.

Referring to FIG. 4, receive instructions 406, when executed by a processor (e.g., 402), may cause system 400 to receive, by a first device, a plurality of Unidirectional Link Detection (UDLD) protocol messages transmitted from a second device to a first device. The plurality of ULDL messages may be used to detect unidirectional L2 links and the first device may be configured with a first interval configuration value corresponding to a frequency which the first device sends the UDLD protocol messages to the second device.

Interval determine instructions 408, when executed by a processor (e.g., 402), may cause system 400 to determine, by the first device, a second interval configuration value of the second device. The second interval configuration value corresponding to a frequency which the second device sends the UDLD protocol messages to the first device;

Mismatch determine instructions 410, when executed by a processor (e.g., 402), may cause system 400 to determine, on the first device, that there is a configuration mismatch between the first device and the second device. A correct configuration of the UDLD protocol requires the first device and the second device use a same number of intervals.

Log creation instructions 412, when executed by a processor (e.g., 402), may cause system 400 to create a log entry for the configuration mismatch, the log entry including the first and second interval configuration values.

The foregoing disclosure describes a number of examples for UDLD misconfiguration auto-detection. The disclosed examples may include systems, devices, computer-readable storage media, and methods for UDLD misconfiguration auto-detection. For purposes of explanation, certain examples are described with reference to the components illustrated in FIGS. 1-4. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
receiving, by a first device, a plurality of Unidirectional Link Detection (UDLD) protocol messages transmitted from a second device to a first device, wherein the plurality of UDLD messages are used to detect unidirectional L2 links and the first device is configured with a first interval configuration value corresponding to a frequency which the first device sends the UDLD protocol messages to the second device;
determining whether a total number of the received plurality of UDLD protocol messages meets a predetermined threshold, wherein the predetermined threshold corresponds to a sufficient number of received messages to allow the first device to determine a second interval configuration value while accounting for a cold boot scenario;
in response to the total number of the received plurality of UDLD protocol messages meeting the predetermined threshold, determining, by the first device, the second interval configuration value of the second device, the second interval configuration value corresponding to a frequency which the second device sends the UDLD protocol messages to the first device; determining, on the first device, that there is a configuration mismatch between the first device and the second device, wherein a correct configuration of the UDLD protocol requires the first device and the second device use a same interval configuration value; and creating a log entry for the configuration mismatch, the log entry including the first and second interval configuration values.

2. The method of claim 1 wherein the plurality of UDLD messages sent from the second device to the first device does not include the second interval configuration value.

3. The method of claim 1 comprising:
timestamping, by the first device, the plurality of UDLD protocol messages at the time the messages were received from the second device;
storing, by the first device, the plurality of UDLD protocol messages in a timestamp array; and
clearing, by the first device, the timestamp array after the configuration mismatch has been determined.

4. The method of claim 1 comprising:
changing, by the first device, the first interval configuration value of the first device to match the second interval configuration value of the second device.

5. The method of claim 1 comprising:
transmitting, by the first device, a configuration message to the second device, the configuration message indicating the configuration mismatch and including the first and second interval configuration values.

6. The method of claim 1 comprising:
determining, by the first device, a UDLD mode of the second device based on the plurality of UDLD protocol messages.

7. A system comprising:
a message receiver to receive, by a first device, a plurality of Unidirectional Link Detection (UDLD) protocol messages transmitted from a second device to a first device, wherein the plurality of UDLD messages are used to detect unidirectional L2 links and the first device is configured with a first interval configuration value corresponding to a frequency which the first device sends the UDLD protocol messages to the second device;
a threshold determiner to determine, by the first device, whether a total number of the received plurality of UDLD protocol messages meets a predetermined threshold, wherein the predetermined threshold corresponds to a sufficient number of received messages to allow the first device to determine a second interval configuration value while accounting for a cold boot scenario;
an interval determiner to determine, by the first device, the second interval configuration value of the second device in response to the threshold determiner determining that the total number of the received plurality of UDLD protocol messages meets the predetermined threshold, the second interval configuration value corresponding to a frequency which the second device sends the UDLD protocol messages to the first device;
a mismatch determiner to determine, on the first device, that there is a configuration mismatch between the first device and the second device, wherein a correct configuration of the UDLD protocol requires the first device and the second device use a same interval configuration value; and
a log creator to create a log entry for the configuration mismatch, the log entry including the first and second interval configuration values.

8. The system of claim 7 wherein the plurality of UDLD messages sent from the second device to the first device does not include the second interval configuration value.

9. The system of claim 7 comprising:
a timestamp handler to timestamp, by the first device, the plurality of UDLD protocol messages at the time the messages were received from the second device; and
an array handler to store, by the first device, the plurality of UDLD protocol messages in a timestamp array and clear the timestamp array after the configuration mismatch has been determined.

10. The system of claim 7 comprising:
an interval changer to change, by the first device, the first interval configuration value of the first device to match the second interval configuration value of the second device.

11. The system of claim 7 comprising:
a message transmitter to transmit, by the first device, a configuration message to the second device, the configuration message indicating the configuration mismatch and including the first and second interval configuration values.

12. The system of claim 7 comprising:
a mode determiner to determine, by the first device, a UDLD mode of the second device based on the plurality of UDLD protocol messages.

13. A non-transitory computer-readable storage medium encoded with instructions, the instructions executable by a processor of a system to cause the system to:
receive, by a first device, a plurality of Unidirectional Link Detection (UDLD) protocol messages transmitted from a second device to a first device, wherein the plurality of UDLD messages are used to detect unidirectional L2 links and the first device is configured with a first interval configuration value corresponding to a frequency which the first device sends the UDLD protocol messages to the second device;
determining whether a total number of the received plurality of UDLD protocol messages meets a predetermined threshold, wherein the predetermined threshold corresponds to a sufficient number of received messages to allow the first device to determine a second interval configuration value while accounting for a cold boot scenario;

in response to the total number of the received plurality of UDLD protocol messages meeting the predetermined threshold, determine, by the first device, the second interval configuration value of the second device, the second interval configuration value corresponding to a frequency which the second device sends the UDLD protocol messages to the first device; determine, on the first device, that there is a configuration mismatch between the first device and the second device, wherein a correct configuration of the UDLD protocol requires the first device and the second device use a same interval configuration value; and create a log entry for the configuration mismatch, the log entry including the first and second interval configuration values.

14. The non-transitory computer-readable storage medium of claim 13 wherein the plurality of UDLD messages sent from the second device to the first device does not include the second interval configuration value.

15. The non-transitory computer-readable storage medium of claim 13, the instructions executable by a processor of a system to cause the system to:

timestamp, by the first device, the plurality of UDLD protocol messages at the time the messages were received from the second device;

store, by the first device, the plurality of UDLD protocol messages in a timestamp array; and clear, by the first device, the timestamp array after the configuration mismatch has been determined.

16. The non-transitory computer-readable storage medium of claim 13, the instructions executable by a processor of a system to cause the system to:

change, by the first device, the first interval configuration value of the first device to match the second interval configuration value of the second device.

17. The non-transitory computer-readable storage medium of claim 13, the instructions executable by a processor of a system to cause the system to:

transmit, by the first device, a configuration message to the second device, the configuration message indicating the configuration mismatch and including the first and second interval configuration values.

* * * * *